United States Patent [19]

Lisfeld et al.

[11] Patent Number: 4,572,614
[45] Date of Patent: Feb. 25, 1986

[54] CONDENSER HOUSING FOR MICROSCOPES

[75] Inventors: Robert Lisfeld, Greifenstein-Ulm; Edwin Diehl, Waldsolms, both of Fed. Rep. of Germany

[73] Assignee: Ernst Leitz Wetzlar GmbH, Wetzlar, Fed. Rep. of Germany

[21] Appl. No.: 588,456

[22] Filed: Mar. 12, 1984

[30] Foreign Application Priority Data

Mar. 21, 1983 [DE] Fed. Rep. of Germany ... 8308331[U]

[51] Int. Cl.⁴ ............................................... G02B 7/00
[52] U.S. Cl. .................................................... 350/315
[58] Field of Search ............... 350/247, 252, 254, 257, 350/315, 523–528

[56] References Cited

U.S. PATENT DOCUMENTS

| | | | |
|---|---|---|---|
| 2,067,189 | 1/1937 | Howell | 350/257 |
| 2,660,926 | 12/1953 | Talley | 350/315 |
| 3,656,841 | 4/1972 | Heinonen, Jr. | 350/315 |
| 4,050,791 | 9/1977 | Watanabe | 350/257 |
| 4,407,569 | 10/1983 | Piller et al. | 350/526 |

*Primary Examiner*—William H. Punter
*Attorney, Agent, or Firm*—Schwartz, Jeffery, Schwaab, Mack, Blumenthal & Evans

[57] ABSTRACT

A microscope condenser housing having an annular slit to receive filter slides, which during their insertion are arrested in two defined positions. A locking device effective against the outward motion of the filter slides and additionally locking the filter slides in at least one of the defined positions is provided. Incorrect inverted insertion of the filter slides is also prevented. The locking by the locking device is readily released manually by means of a locking lever projecting from the condenser housing.

7 Claims, 2 Drawing Figures

CONDENSER HOUSING FOR MICROSCOPES

BACKGROUND OF THE INVENTION

1. Field of the Invention

The invention relates generally to a condenser housing for microscopes with an annular slit to receive filter slides and, more particularly, to such housings having guide rails and a stationary stop, the filter slides being immobilized by means of an arresting mechanism in at least one defined position within the guide rails.

2. Description of the Prior Art

Condenser housings of the configuration described above are known in principle. The filter slides have, on one longitudinal side, two indexing notches which are spaced at a selected distance from one another and are engaged successively during the insertion and extraction of the filter slides by a movable locking roller biased by a spring. The slides are not secured adequately in a stand-by position after extraction by the locking mechanism because the last index position is frequently accidently passed over. Furthermore, the filter slides may often be inserted incorrectly, i.e., with their top side downward into the condenser housing. In such a case, locking is impossible.

SUMMARY OF THE INVENTION

It is an object of the invention to provide a condenser housing of the type described above from which the filter slides cannot be extracted accidently, and which ensures that the filter slides are always correctly inserted and held in the inserted state so that they cannot be lost.

According to the invention this object is attained by supplementing the arresting mechanism with a fixed locking device which prevents outward motion of the filter slides, the locking device being manually releasable. In this manner, the filter slides are reliably secured against accidental removal from the condenser housing, while at the same time permitting their rapid exchange.

This is accomplished by providing a microscope housing having a slit to receive a slide with guiding means to guide the slide within the slit, securing means to secure the slide in an indexing position by engaging indexing notches provided on the slide, of which there may be several, and manually releasable locking means to lock the slide in at least one predetermined position against withdrawal from the slit, by engaging a locking pin on said slide, of which there may also be more than one.

Further details of the invention will become apparent from the description hereinafter of embodiments schematically illustrated in the drawings.

DETAILED DESCRIPTION OF PREFERRED EMBODIMENTS

In one embodiment, the filter slides may be indexed in two positions, and the locking position of the fixed locking device can be associated with the first registered position of the arresting mechanism encountered upon insertion. Thus, the filter slides, upon their insertion in the annular slit of the condenser housing, are registered initially in an optically ineffective stand-by position from which they may be removed only after the fixed locking device has been released manually. In the completely inserted position, wherein the filter slide involved is located, together with the corresponding filters, in an optically effective position in the path of the illuminating beam, the arresting mechanism immobilizes the slide in a second registered position, from which it can be removed without manually releasing the locking mechanism.

It is further conceivable to coordinate the locking position of the fixed locking device with both indexing or registered positions of the arresting mechanism so that the filter slides are immobilized in their completely inserted position as well.

In an advantageous further embodiment of the invention, the fixed locking device may be mounted (to save space) on an annular plate on the side opposite the arresting mechanism, the annular plate being securable above the guide rails for the filter slides in the condenser housing. The annular plate simultaneously forms an upper boundary for the filter slides in the condenser housing. It should be understood, however, that the fixed locking device may also be arranged on the same side as the arresting mechanism and attached directly to the condenser housing.

The fixed locking system advantageously comprises a locking lever under spring action with a vertical extension within the condenser housing, and at least one lock pin located on the filter slides. During insertion of the filter slides into the condenser housing, the lock pin slides in a groove on the bottom side of the annular plate and also prevents the incorrect insertion of the filter slides. The vertical extension of the locking lever projects through a breach in the annular plate into the path of the lock pin and may be removed from that path by manual actuation of the locking lever.

The immobilization of the filter slide in the completely inserted position may be achieved in a simple manner by an additional lock pin on the filter slides.

Figure 1:
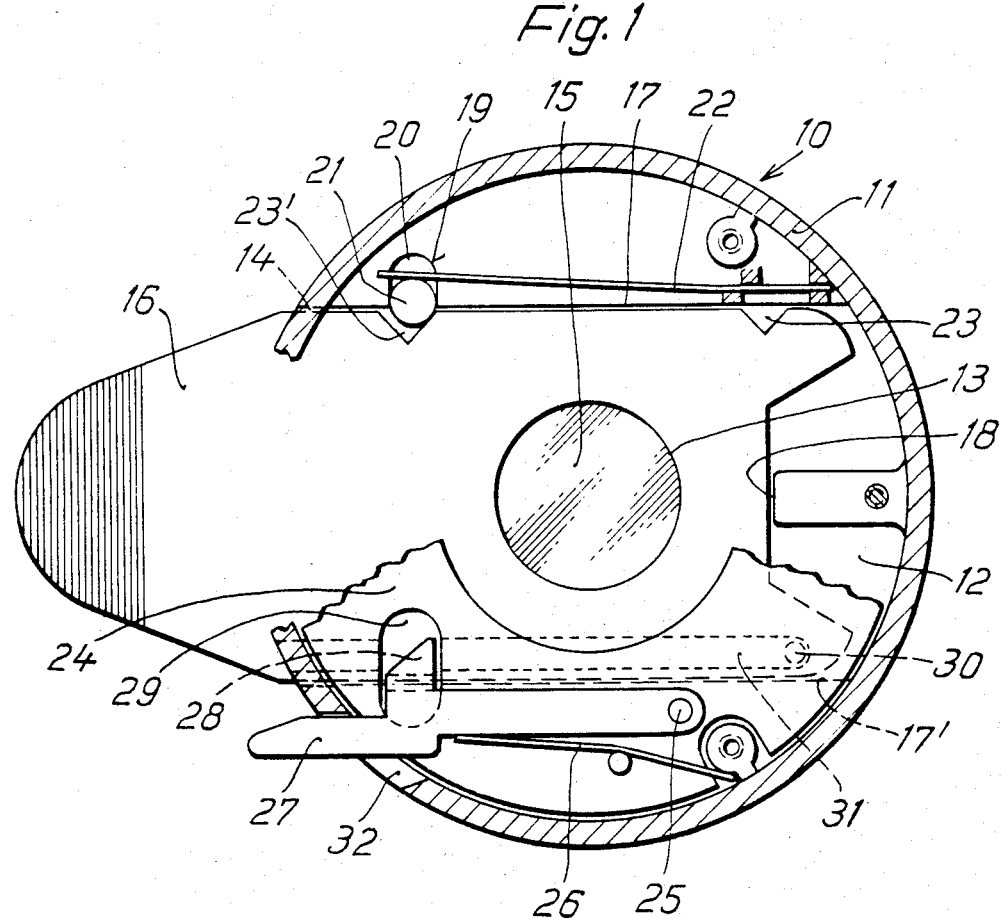
FIG. 1 shows a top view of the condenser housing according to the invention in a partial sectiton.

The condenser housing 10 shown in FIG. 1 comprises essentially a cylindrical support body 11 with a bearing plate 12 molded onto the inside of said support body. The bearing plate 12 is provided with a centered light passage 13. The support body 11 has an annular slit 14, whereby the filter slides 16 carrying the filters 15 may be inserted into the condenser housing 10. The filter slides 16 slide with their longitudinal sides in the guide rails 17 and 17', provided on the bearing plate 12 in the form of web-like projections. The inserting path of the filter slides 16 is limited by a stationary stop 18, also located on the bearing plate 12.

The filter slides 16 may be immobilized from going backward or forward in two defined positions by means of arresting mechanism 19. The arresting mechanism 19 consists of an arresting roller 21 displaceable in an elongated recess 20 of the bearing plate 12 and a flat spring 22, which biases or pushes the arresting roller 21 into either a forward or a rear indexing notch 23, 23' in one longitudinal side of the filter slides 16. Upon the insertion of a filter slide 16 through the annular slit 14, initially a first immobilization of the filter slide in a stand-by position takes place, wherein the filter is located in an optically ineffective manner in front of the light passage orifice 13. Upon the further insertion of the filter slide 16 into the optically effective position of the filter 15, the arresting roller 21 locks into the rear indexing notch 23', wherein the inserting movement is limited by the stop 19. The position of the rear indexing notch 23' is preferably chosen so that the filter slide 16 is pressured in a slightly resilient manner against the stop 18.

Figure 2:
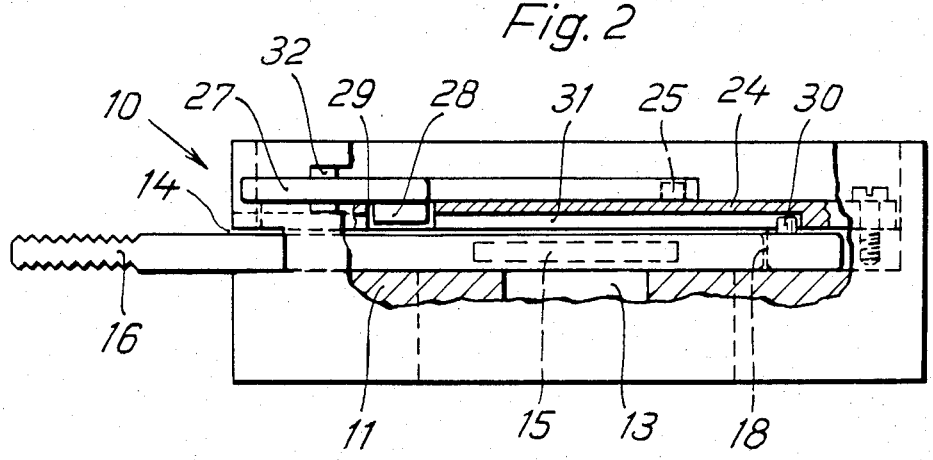
FIG. 2 shows a lateral elevation of the condenser housing in a partial section.

As seen in particular in FIG. 2, above the guide rails 17, 17' (not visible in FIG. 2) of the filter slides 16, an annular plate 24 is arranged parallel to the bearing plate 12 in the condenser housing 10, for example, bolted to the bearing plate 12. A mounting pin 25 is located on the annular plate 24 and carries a locking lever 27 that may be pivoted against the action of a spring 26. The locking lever 27 has a downward extension 28 which projects through an elongated breach 29 in the annular plate 24 into the path of a lock pin 30 provided on the forward area of the filter slides 16. The lock pin 30 slides during the insertion and retraction of the filter slide 16 in a U-shaped groove 31 indicated by a broken line, in the bottom side of the annular plate 24. The lock pin 30 also prevents the incorrect insertion of the filter slides 16 through the annular slit 14 into the condenser housing 10, as it is higher than the height of the annular slit 14.

The locking lever 27, the extension 28 and the lock pin 30 together comprise a fixed locking system that prevents outward movement of the filter slide 16, in the presently illustrated embodiment, past the optically ineffective stand-by position. That is, the lock pin 30 prevents the filter slide from sliding past the extension 28 and from being accidentally removed from the condenser housing 10. The position of the lock pin 30 on the filter slides 16 is preferablly chosen so that the lock position is coordinated with the arresting position in the forward indexing notch 23. By actuating the locking lever 27 which protrudes through an orifice 32 in the condenser housing 10, the locking action is readily released during the extraction of the filter slide 16, and the filter slides 16 may be removed from the condenser housing 10.

As mentioned above, a second lock pin, not shown, may be provided on the filter slides 16 opposite to the indexing notches 23'. In this manner the filter slides 16 may also be locked in the optically effective position of the filters 15.

One of ordinary skill in the art will appreciate that many departures may be made from the embodiments described above without departing from the teachings and scope of the invention. Accordingly, the invention is not limited to the above-described embodiments, but is instead limited only by the following claims.

What is claimed is:

1. A microscope housing having a slit for receiving a slide which has at least one indexing notch along one side thereof, comprising:

means connected to said housing and adjacent to said slit for guiding said slide upon insertion into said slit;

means connected to said housing and adjacent said slit for securing said slide in an indexing position by engaging an indexing notch provided on said slide; and manually releasable means connected to said housing and adjacent said slit for moving between a first locking position for preventing said slide from being removed from said housing, and a second, manually released position for allowing said slide to be removed from said housing, wherein, when said releasable means are in said first position, said slide is arranged to move between an optically effective position and an optically ineffective position.

2. A microscope housing as claimed in claim 1, wherein said securing means secures said slide in either one of first and second indexing positions corresponding to first and second indexing notches in the slide, and wherein said releasable means prevents said slide from being removed past one predetermined position which is substantially the same as one of said first and second indexing positions when said releasable means are in said first position.

3. A microscope housing as claimed in claim 2, wherein said locking means is mounted within said housing on the side of the slit opposite to said securing means.

4. A microscope housing as claimed in claim 3, further comprising an annular plate above said guiding means, and wherein said locking means is mounted on said annular plate.

5. A microscope housing as claimed in claim 4, wherein said locking means further comprises:

a locking lever pivotably mounted on said annular plate;

spring means in contact with said locking lever for biasing said locking lever into a locking position; and means connected to said locking lever for engaging a first lock pin provided on said slide.

6. A microscope housing as claimed in claim 5, wherein said engaging means projects through a breach in said annular plate.

7. A microscope housing as claimed in claim 5, wherein a second lock pin is provided on said slide.

* * * * *